March 27, 1956 D. FIRTH 2,739,830
SHAFT COLLARS
Filed Feb. 23, 1951 5 Sheets-Sheet 1
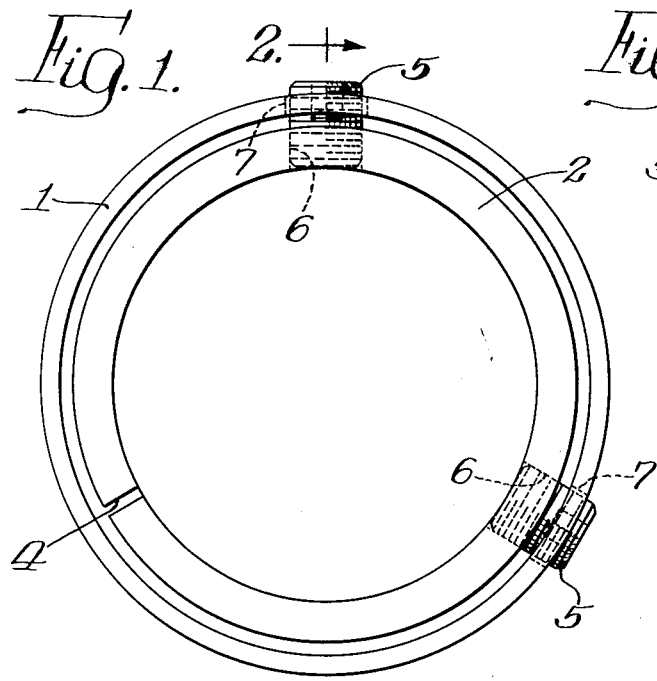
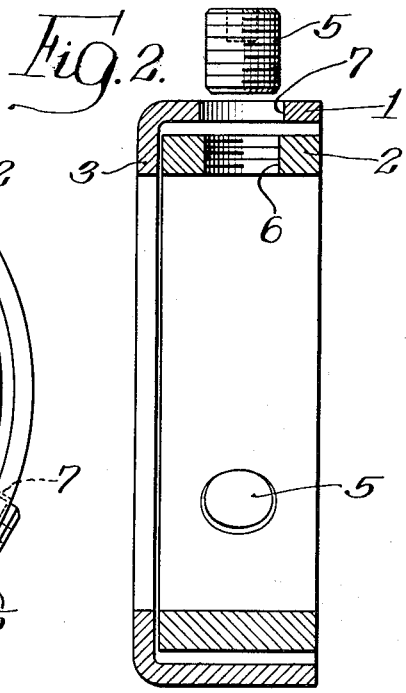
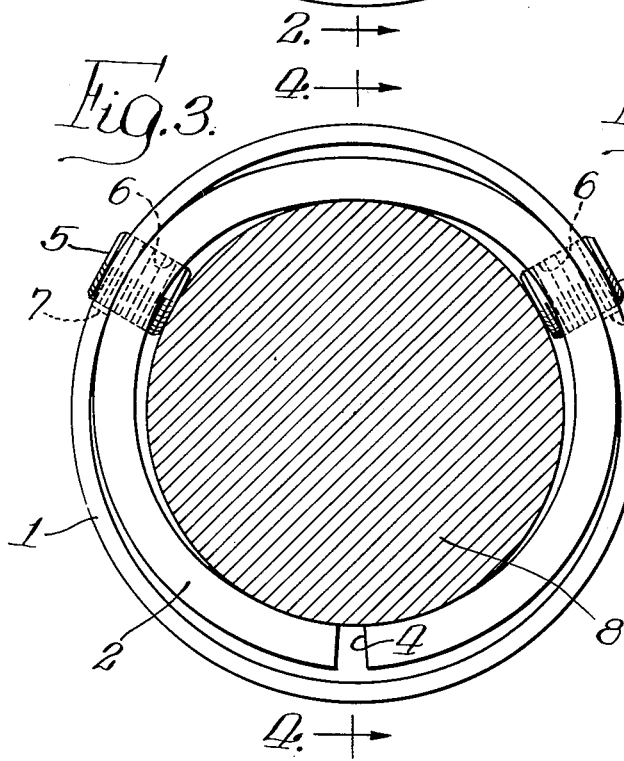
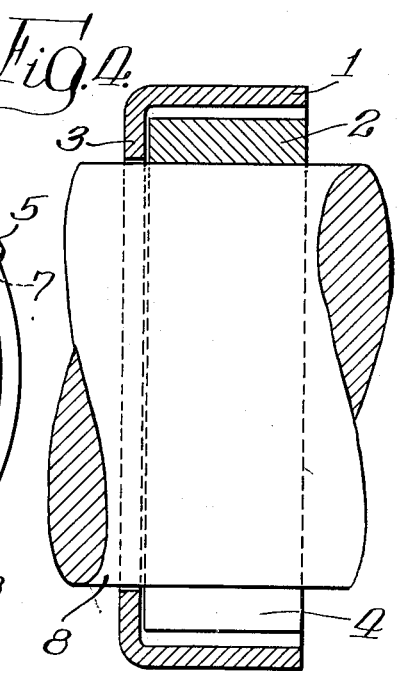
INVENTOR.
David Firth,
BY Osgood H. Dowell
Atty.

March 27, 1956 — D. FIRTH — 2,739,830
SHAFT COLLARS
Filed Feb. 23, 1951 — 5 Sheets-Sheet 2
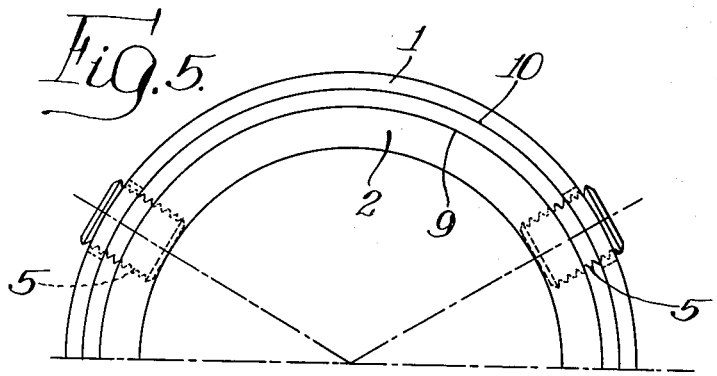
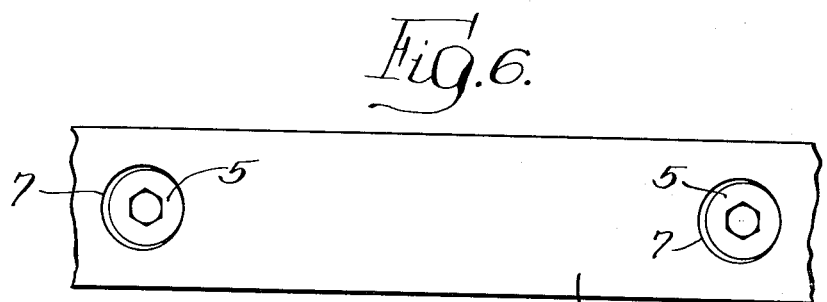
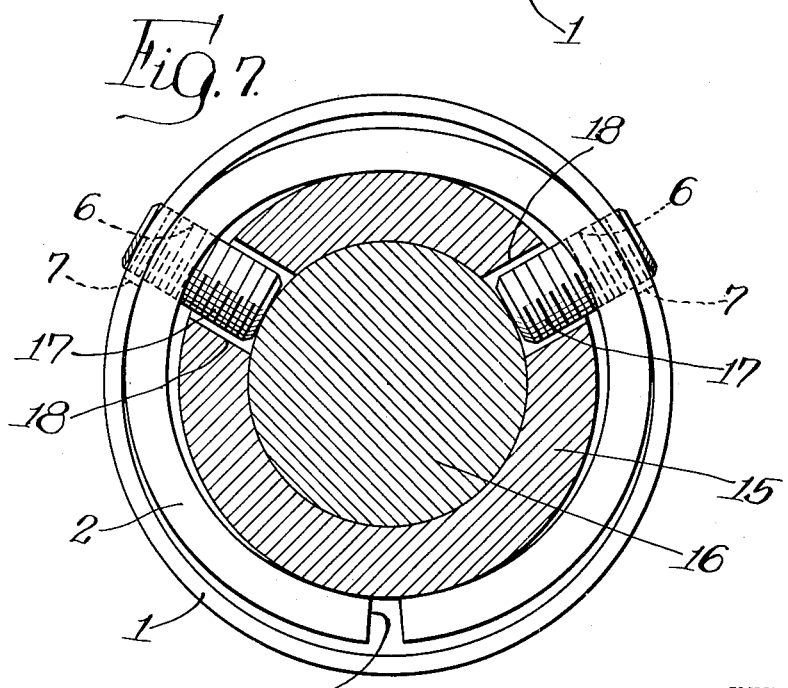
INVENTOR.
David Firth,
BY Osgood H. Dowell
Atty.

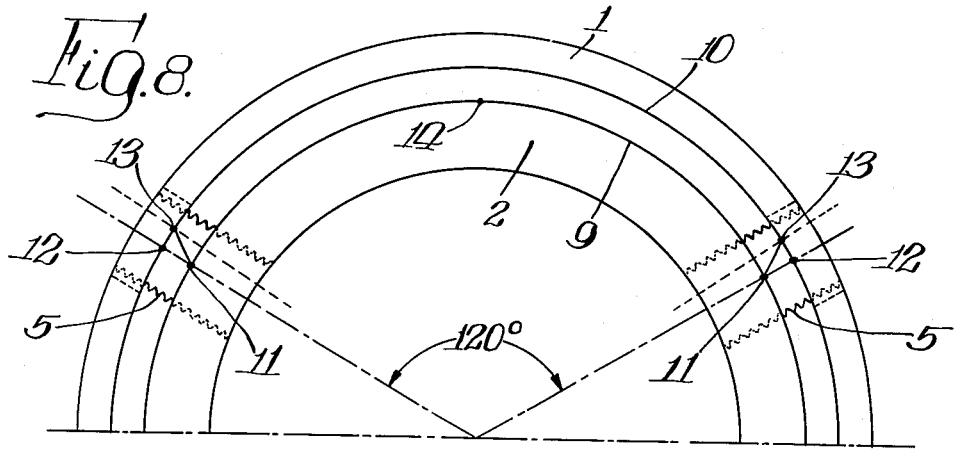
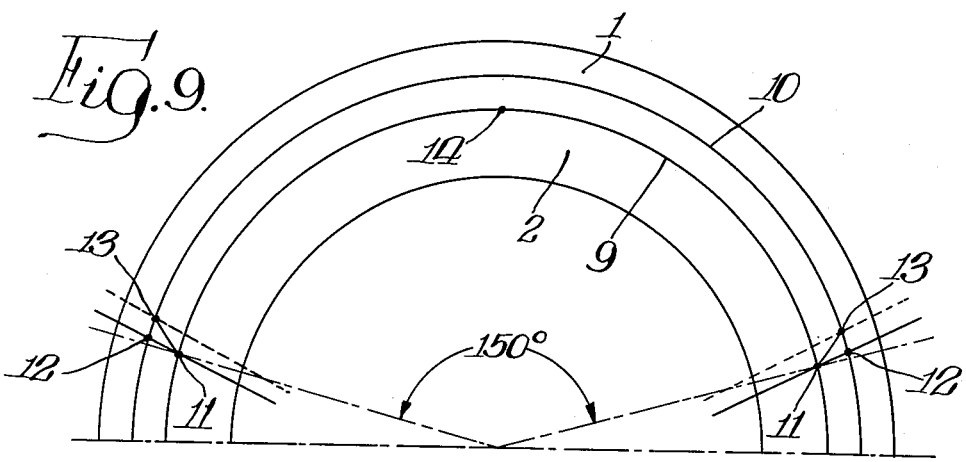
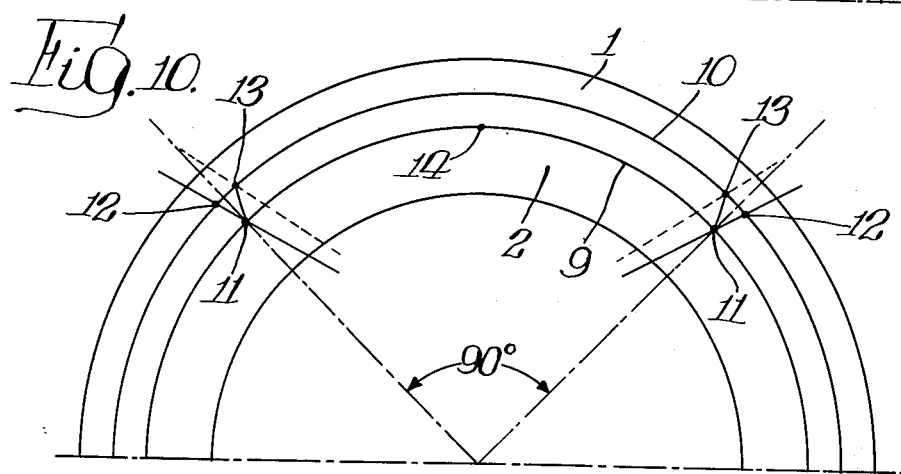

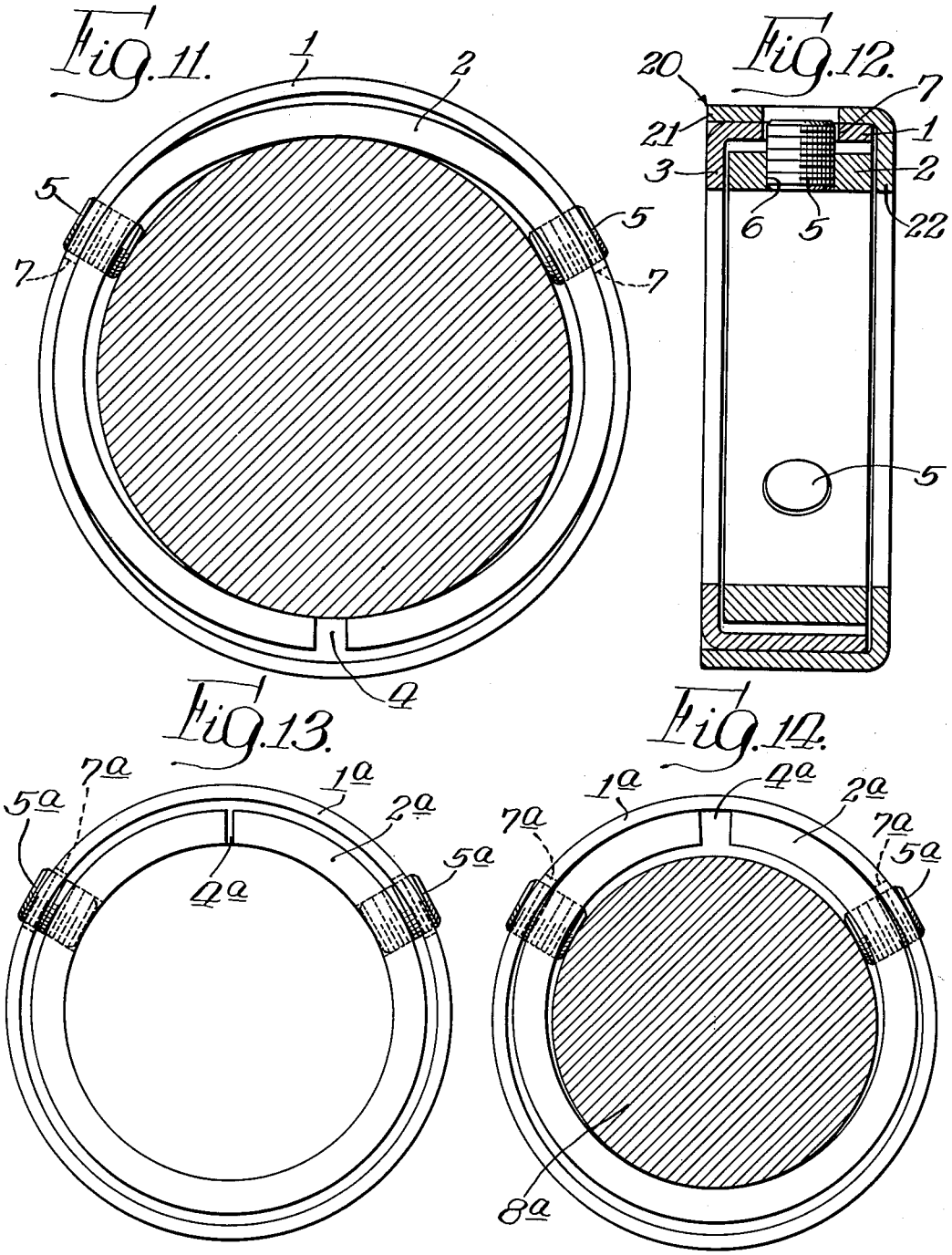

March 27, 1956     D. FIRTH     2,739,830
SHAFT COLLARS
Filed Feb. 23, 1951     5 Sheets—Sheet 5
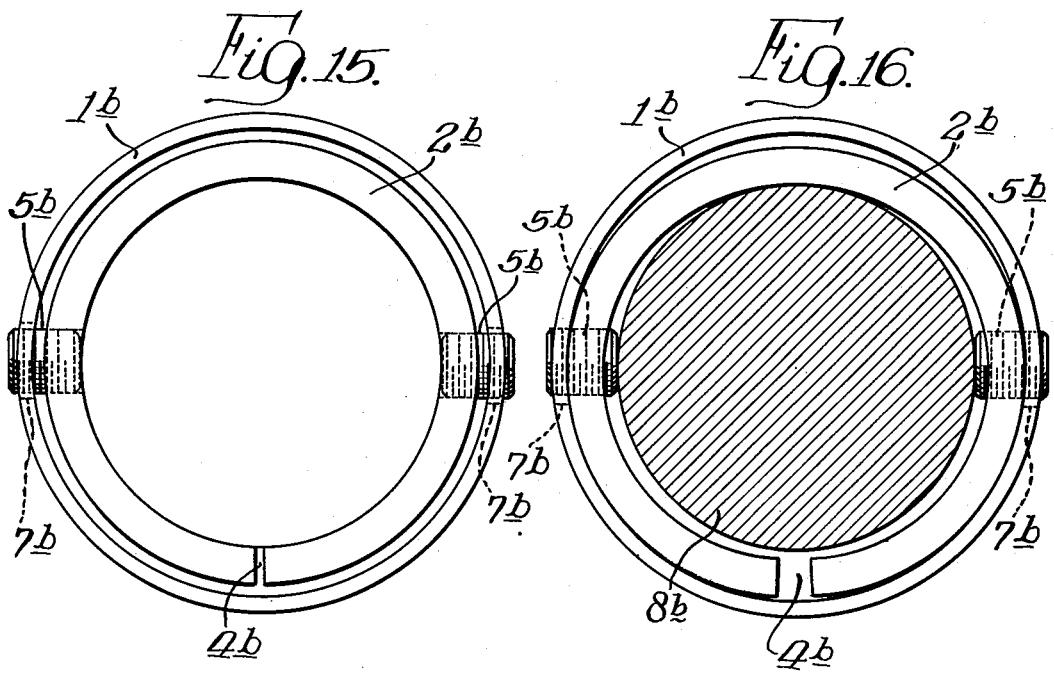
INVENTOR.
David Firth,
BY Osgood H. Dowell
Atty.

United States Patent Office 2,739,830
Patented Mar. 27, 1956

2,739,830

SHAFT COLLARS

David Firth, South Bend, Ind., assignor to Dodge Manufacturing Corporation, Mishawaka, Ind., a corporation of Indiana Application February 23, 1951, Serial No. 212,354

8 Claims. (Cl. 287—52.08)

This invention relates to collars for use as shaft collars and other uses in machinery.

An ordinary collar consists of a metal ring drilled and tapped through its radial thickness to provide one or more threaded screw-holes for engagement by a set-screw or screws for fastening the collar to a shaft. A collar may be fitted directly on the shaft to which it is fastened, as in the case of a shaft collar, or it may be fitted on an interposed sleeve as in the case of a clamping collar for fastening such sleeve to a shaft. In the latter case the set-screws, in threaded engagement with the collar, pass loosely through so-called clear holes in the sleeve.

Collars are usually made from solid steel shafting by boring and cutting the bored shafting into sections, the work being usually done in an automatic screw machine and in some instances on turret lathes. The cost of manufacture is normally undesirably high, due in part to the expense of machining operations and largely because of wastage of the large amount of metal that is bored out from the shafting.

In the use of shaft collars and clamping collars, the set-screws by which they are fastened are liable to work loose unless locked. Devices such as lock nuts or locking washers not only add to expense but also necessitate use of longer set-screws than would otherwise be required, whereas it is desirable to utilize short screws both for lower cost thereof and to avoid objectionable protuberances of the screws from the peripheries of the collars.

Objects of the present invention include the provision of a practicable and efficient collar of a novel construction susceptible of manufacture at relatively low cost; the provision of a practicable and efficient collar of a composite construction which by appropriate design will effect automatic locking of the set-screws; and the provision of a collar giving the advantages of both relatively inexpensive construction and screw-locking capability.

A collar embodying the invention comprises an outer ring and a split resilient inner ring loose in the outer ring, said inner ring having threaded holes and said outer ring having clear holes for a pair of angularly spaced set-screws for fastening the rings together and to a shaft on which the inner ring fits. Clear holes in the sense of this specification are threadless holes through which the screws are insertible into the threaded holes therefor. For simplicity and lightness as well as economical construction, the outer ring may be a cup-shaped shell made as a stamping of sheet metal, and the split inner ring may be made of rolled steel strip rolled into ring form. The set-screws are so arranged that when fully tightened against a shaft they fasten the inner ring in distorted shape to the shaft and, in cooperation with the distorted inner ring, effect fastening of the outer ring thereto. In many embodiments of the invention, as is desirable in all embodiments, the screws when fully tightened bind in the clear holes of the outer ring and are thereby locked.

In the accompanying drawings:

Fig. 1 is an end elevation of a collar embodying the invention in one practicable form.

Fig. 2 is a longitudinal section of said collar taken on the line 2—2 of Fig. 1, looking in the direction of the arrows, one of the set-screws with which the collar is equipped being shown removed from its screw-hole.

Fig. 3 is an end view of the collar with its parts in the relationship assumed when the collar is fitted on a shaft and fastened thereto by its set-screws, the shaft being shown in cross-section.

Fig. 4 is a longitudinal section on the line 4—4 of Fig. 1.

Fig. 5 is a diagrammatic representation of the half of the collar which contains the set-screws.

Fig. 6 represents a development on a flat surface of a perpiheral portion of the collar under conditions when the rings are concentric but in such angular relation that the clear holes for the set-screws are eccentric to the screws.

Fig. 7 shows the collar in use as a clamping collar for fastening to a shaft a sleeve fitted thereon.

Figs. 8, 9 and 10 are explanatory diagrams.

Fig. 11 is a view corresponding to Fig. 3 of a similar collar of different proportions.

Fig. 12 is a view corresponding to Fig. 2 of a collar having a composite outer ring constructed to retain the inner ring.

Figs. 13 and 14 represent an embodiment of the invention in a collar having a different arrangement of set-screws from that shown in the preceding figures, Fig. 13 being an end elevation and Fig. 14 showing the collar fastened on a shaft.

Figs. 15 and 16 represent an embodiment of the invention in a collar having its set-screws arranged diametrically opposite or at an angle of 180°.

Referring first to Figs. 1 to 4, the collar therein shown comprises an outer ring 1 and a split resilient inner ring 2 of a diameter substantially less than the inside diameter of the outer ring.

The outer ring 1 is a cup-shaped stamping of sheet metal, comprising a tubular body formed at one end with an inturned annular flange 3. Said flange strengthens and rigidifies the ring, which serves as a practically rigid shell. The inside diameter of the flange 3 is at least as great as and preferably larger than the inside diameter of the inner ring, to enable the collar to be slipped on a shaft on which the inner ring closely fits without interference by said flange.

The split inner ring 2 is made of a rolled steel strip rolled into ring form. The split or gap in the ring is indicated at 4 in the drawings. Said ring by virtue of its thickness possesses a high degree of stiffness but is sufficiently flexible to be forcibly distorted as indicated in Fig. 3.

For fastening the collar on a shaft, the collar is equipped with a pair of set-screws 5 engaging in threaded screw-holes 6 in the inner ring and loose in clear holes 7 in the outer ring. A shaft 8 on which the inner ring fits and to which the collar is fastened by the screws is shown in Figs. 3 and 4.

The rings 1 and 2 may be of appropriate longitudinal dimensions to permit utilization of set-screws of large diameter relative to the radial thickness of the inner ring, which is advantageous for strength and increase of threaded engagement of the screws in the inner ring, the latter being of appropriate thickness to permit severe tightening of the screws against the shaft without damage of screw-threads.

With respect to the arrangement of the screws, the collar shown in said Figs. 1 to 4 exemplifies a species of the invention having both screws 5 in the same half of the collar and arranged at an angle of considerably less than 180° and having the split or gap 4 in the inner ring opposite the portion of said ring between the screws.

Preferably the split or gap 4 is diametrically opposite a point in said ring midway between the screws. In this instance the screws 5 are shown centered on radii arranged at an angle of 120 degrees, though this is but exemplary. The angle could be less or more, and in possible embodiments of the invention the screws could be canted from the position shown.

Due in part to a substantial difference between the I. D. or inside diameter of the outer ring and the O. D. or outside diameter of the inner ring, and in part to suitable conditions as to the disposition and angular spacing of the screws, the circumferential distance between the screw centers on the outside circumference of the inner ring is substantially less than the circumferential distance between said centers on the inside circumference of the outer ring. This is readily observable from the diagram Fig. 5, wherein the arc of the circle 9 between the screw centers is noticeably substantially shorter than the arc of the circle 10 between said centers. The difference between said circumferential distances or lengths of such arcs is hereinafter referred to as the circumferential differential.

To fasten the collar to the shaft on which it fits, the screws are screwed up and tightened against the shaft, as in the case of fastening an ordinary shaft collar. As the screws are tightened against the shaft, the screw-engaged portions of the split inner ring 2 are drawn outwardly in diverging directions, with resultant distortion of said ring and accompanying shifting of the screw centers toward each other relative to the outer ring. In this operation, the screws tension the intervening portion of said ring, drawing it tight against the shaft, while the end portions of the split ring, by virtue of its distortion, are pressed against the shaft by the stressed portions of said ring between said end portions and the screws. The inner ring 2 is thereby fastened rigidly to the shaft by the screws. The outer ring 1 becomes fastened to the inner ring by binding of the screws in the clear holes 7 as hereinafter explained, and also, in the illustrative structure, by the screwing up of the screw-engaged portions of the inner ring against the outer ring and pressure of portions of the distorted inner ring against the outer ring.

The distance which the screw centers approach each other on the inside circumference of the outer ring 1 is the sum of the distances which they respectively shift on said circumference. The maximum distance which they could approach on said circumference, if the screw clearance in the clear holes 7 were sufficient to allow it, depends upon the circumferential differential aforesaid. If the centers of the screws as they are tightened approach such maximum distance on said circumference, the screw-engaged portions of the split inner ring 2 will have been screwed up tight against the outer ring 1.

The clear holes 7 are of a diameter exceeding that of the screws by an amount materially less than said maximum distance of approach of the screw centers on said inside circumference of the outer ring. Hence the screws as they are tightened become locked by binding against and in some cases biting into the walls of the clear holes at their inner sides, i. e. the sides of the two clear holes which are nearest each other or included in the angle between the screws.

Where, as in the illustrative structure, both clear holes 7 are of the same diameter, and both screws are of the same diameter, the clearance to be taken up by the screws in the clear holes before binding begins is substantially equal to the difference between the diameter of one clear hole and that of one screw. Inasmuch however as the clear holes might be of unequal diameters, or in the form of slots instead of round holes, the clearance to be taken up in the clear holes should be understood to mean the sum of the distances between the screws and innermost walls of the clear holes, or in other words the sum of the distances which the screws must shift toward each other in the respective clear holes before binding begins. This sum may be in some cases as little as $\frac{1}{64}''$.

In the illustrative structure, the clear holes 7 are so centered in the outer ring 1 that they may be concentric with the threaded screw-holes 6 when the rings are in concentric relation; however eccentricity of the clear holes to the screws would not affect the clearance to be taken up in the clear holes. This will be readily understood by reference to Fig. 6, which represents a development on a flat surface of a peripheral portion of the collar when the rings 1 and 2 are concentric but in such angular relation that the clear holes 7 are eccentric to the setscrews. As the screws in Fig. 6 are tightened, the left-hand screw shifting to the right imparts a corresponding turning movement to the outer ring 1, while the right-hand screw shifting toward the left takes up the clearance in the right-hand clear hole. Obviously the distance which the screws must shift toward each other to take up clearance in the screw-holes is the same in Fig. 6 as if the clear holes thereof were concentric with the screws.

Assuming a sufficiently restricted clearance to be taken up in the clear holes, then by fully tightening the screws not only do they become effectively locked against loosening but also the outer ring becomes rigidly fastened to the inner ring 2 by the screws. Thus the structure comprising the loosely interfitted rings and set-screws becomes a rigid structure securely fastened to the shaft by the setscrews.

The condition above assumed as to a sufficiently restricted clearance to be taken up in the clear holes, or, conversely stated, a condition of shiftability of the screw centers toward each other on said inside circumference of the outer ring a distance materially greater than said clearance to be taken up, is one which exists in the disclosed structure of Figs. 1 to 4 and is readily established in numerous collars of different sizes and designs embodying the invention.

If the clearance to be taken up in the clear holes be only slightly less than the maximum distance of approach of the screws on said inside circumference of the outer ring, then binding of the screws in the clear holes may occur as the screws draw the screw-engaged portion of ring 2 tight against the outer ring. It is practical to design a collar which will give this result. However, it is not necessary that the screw-engaged portions of the inner ring be drawn against the outer ring, unless required by the design, i. e. by a condition such that said maximum distance is only slightly less than a predetermined clearance to be taken up in the clear holes. To obtain effectual locking of the screws and fastening of the outer ring rigidly to the inner ring, it is sufficient if the screws as they are tightened bind effectually in the clear holes. It therefore becomes a relatively simple matter to design collars of different sizes and proportions embodying the invention, by adopting for the same a predetermined small clearance to be taken up in the screw holes, and then designing the respective collars to give shiftability of the screw centers toward each other, on the inside circumference of the inner ring, for a distance materially greater than said predetermined small clearance to be taken up. For example, if the diameter of the clear holes 7 be only $\frac{1}{64}''$ larger than the diameter of the screws, giving a normal clearance for screws, then the clearance to be taken up in the clear holes would be only $\frac{1}{64}''$; so that shifting of the screw centers toward each other on said circumference a distance only slightly in excess of $\frac{1}{64}''$ would be sufficient to obtain binding.

In collars of various sizes and designs, the difference between the I. D. of the outer ring and the O. D. of the inner ring may range from about a sixteenth of an inch to a quarter of an inch or more, a relatively small clearance between the rings being feasible if the angular spacing of the screw centers is relatively large, and a larger clearance between said rings being necessary if said angular spacing is relatively small. In the case of a collar of the species represented by Figs. 1 to 4, the angular spacing of the screws should be large enough to enable the screws as they are tightened to draw the intervening portion of the ring 2 against the shaft and to shift toward each other on the inside circumference of the outer ring a distance materially greater than the clearance to be taken up by the screws in the clear holes. For practical purposes, in different embodiments of said species of the invention, the angle between the screw centers may be in the range of from about 90° to 150°, though it is not intended to exclude a construction in which said angle is less or greater than in the indicated range, if it obtains fastening of the rings together and to the shaft by the tightening of the screws against the shaft.

As hereinbefore indicated, the maximum approachability of the screw centers toward each other on the inside circumference of the outer ring, if permitted by the screw clearance in the clear holes 7, is dependent upon the circumferential differential aforesaid, which in turn is dependent upon the difference between the I. D. and the O. D. aforesaid and the disposition and angular spacing of the screws. As said circumferential differential is increased or decreased, said maximum approachability is increased or decreased proportionally. If the screws are centered on radii of the inner ring at an angle of from about 90° to about 150°, said maximum approachability will be substantially more than half of the circumferential differential. By canting the screws toward each other with respect to such radii as shown for example in Fig. 9, the circumferential differential and hence said maximum approachability of the screws is materially decreased. By canting the screws away from each other as shown for example in Fig. 10, the circumferential differential is materially increased.

Though the screws may be theoretically centered on radii, tolerable inaccuracies may occur in manufacture. Within reasonable limits of tolerance, the screw centers may be slightly offset from but parallel with such radii, or the screw centers may be slightly inclined at angles of not more than five degrees to radii intersecting the screw centers at or about the outside circumference of the inner ring. If the screws be approximately centered on radii within these limits of tolerable inaccuracies, the circumferential differential may be determined approximately by treating such radii as the screw centers.

In a construction having the screws centered on radii, the circumferential differential considered as an unknown quantity X, may be determined by the formula $$X = \frac{(D-d) \times 3.1416 \times L}{360}$$

where D is the I. D. or inside diameter of the outer ring, $d$ the O. D. or outside diameter of the inner ring, and L the angle between the screw centers.

Results of applications of this formula are as follows:

Where $D-d$ is only 1/16" (.0625") and the angle between the screw centers is 90° or a fourth of a circle, X is .0492". If the clearance to be taken up by the screws in the clear holes is only 1/64" or .015", then a circumferential differential of .0492" gives an excess of .0342" over such clearance. Since the maximum approachability of the screw centers on the inside circumference of the outer ring is substantially greater than half of the circumferential differential, it follows that said maximum approachability in this instance is substantially more than nine thousandths of an inch greater than the clearance aforesaid. By increasing the angle between the screw centers to 120°, X becomes .0655", which exceeds such clearance by .0505". By increasing the angle to 150°, X would become .082", exceeding such clearance by .067".

If $D-d$ is 3/32" (.0937") and the angle between the screw centers is 90°, X is .0735", giving an excess of .0585" over the clearance aforesaid. By increasing the angle to 120°, X becomes .0981". If the angle be increased to 150°, X would be .122".

Where $D-d$ is 1/8" (.125") and the screws are angularly spaced 90° between their centers, X is .098". If the angle between the screw centers is 120°, X is .13", and if the angle be 150°, X becomes .161".

If the difference between the diameters aforesaid be as much as 3/16" (.1875), X would have the comparatively large values of .147" for screws set at an angle of 90°, and .196" if the angle be 120°, and .245" if the angle be 150°. And if the difference between said diameters be a quarter of an inch, then with the screws arranged at even the relatively small angle of 90°, X would have the relatively large value of .196", nearly a fifth of an inch, which value would be increasable by increasing the angular spacing of the screws.

In the diagrams shown in Figs. 8, 9 and 10, the screw centers shown in full lines intersect the circles 9 and 10 at the points 11 and 12. Arcs struck from the point 14 and intersecting the circle 9 at the points 11 will intersect the circle 10 at the points 13. If the screws as they are tightened draw the screw-engaged portions of the inner ring 2 tight against the outer ring 1, or, in other words, if maximum approach of the screws toward each other should occur, then the points 11 on the screw centers will have shifted to about the positions of the points 13. Hence the maximum approachability of the screw centers toward each other on the circle 10 or inside circumference of the ring will be approximately the sum of the arcuate distances from the points 12 to the points 13.

In Figs. 9 and 10, the screw centers are canted with respect to radii intersecting the screw centers at the outside circumference of the inner ring. In Fig. 9 the screws are canted toward each other from such radii. With the screws so arranged, said maximum approachability of the screw centers is less than if the screws were centered on such radii. This arrangement may be of advantage where the angle between the radii is relatively large. In Fig. 10 the screw centers are canted away from each other with respect to such radii, wherefore said maximum approachability is greater than if the screws were centered on said radii. This arrangement may be of advantage where the angle between said radii is relatively small.

In Fig. 7 the illustrative collar hereinbefore described is shown in use as a clamping collar for fastening a sleeve 15 to a shaft 16, the collar being equipped in this instance with relatively long set-screws 17 extending through the sleeve free from threaded engagement therewith, the sleeve being provided with clear holes 18 for said screws. It will be understood of course that the screws 17 are in threaded engagement with the ring 2 in the threaded screw-holes 6 thereof and loose in the outer ring 1 in the clear holes 7 thereof. As the set-screws are tightened against the shaft, the collar operates on and with respect to the sleeve 15 in the same manner in which it operates on and with respect to the shaft 8 in Fig. 3. In this operation the screws draw the sleeve 15 against the side of the shaft 16 opposite the pair of screws, if they are spaced no greater angular distance than about 120° between their centers, while the tensioned portion of the ring 2 between the screws is drawn tight against the sleeve. The sleeve 15 is thereby fastened to the shaft, either by being drawn by the screws tight against the shaft, or by clamping of the sleeve between the shaft and said tensioned portion of the ring 2 between the screws.

There is disclosed in my copending application Serial No. 613,471, filed August 30, 1945, now Patent No. 2,543,905, issued March 6, 1951, a use of a collar for fastening to a shaft an elongated inner race-ring of an antifriction shaft bearing, said collar fitted on the extended rear end portion of said race-ring, being equipped with a pair of set-screws extending through the collar in threaded engagement therewith and loosely through clear holes in the race-ring extension and tightened against the shaft to clamp said extension between the shaft and collar. Collars embodying the present invention may be employed for like uses, giving the advantage of automatic screw-locking and other advantages.

In some embodiments of the invention, distortion of the split inner ring by tightening the screws will result in pressure against the outer ring of diametrically opposite portions of the inner ring or portions thereof between its end portions and the respective screws, as shown in Fig. 11, wherefore in such embodiments the outer ring may be secured firmly to the inner ring by the outward pressing of the latter against the outer ring, or by the same and binding of the screws in the clear holes, as shown in Fig. 11. The collar shown in Fig. 11 is of the same construction as that first described, though of different proportions.

Fig. 12 discloses a collar of a specific construction involving inventive subject-matter in addition to that hereinbefore described. In this instance the outer ring of the collar, designated as a whole by the numeral 20, is a composite annulus comprising interfitted cup-shaped sheet-metal rings 1 and 21 formed and arranged as shown and rigidly united by a tight press fit or by brazing or spot welding. The ring 21 has clear holes registering with those in the ring 1. The inwardly extending flanges 3 and 22 of said rings have inside diameters smaller than the outside diameter of the split inner ring 2, which is thereby retained between said flanges and prevented from removal from the outer ring. Otherwise the construction is the same as that first described. In Fig. 12 the parts dseginated by the numerals 1 to 7 inclusive are identical to the similarly designated parts in Figs. 1 to 4.

The collar shown in Figs. 13 and 14 exemplifies a species of the invention in which the screws are arranged in the half of the collar containing the split or gap in the inner ring, the split or gap being between the screws. The construction shown in these figures is substantially similar to that first hereinbefore described except for the different location of the screws and clear holes therefor and the consequent effect upon distortion of the split inner ring. In said figures, 1ª is the outer ring, 2ª the inner ring, 4ª the split in the latter, 5ª the screws and 7ª the clear holes in the outer ring. These designated parts correspond to the parts designated by the numerals 1, 2, 4, 5 and 7 in Figs. 1 to 4.

As the screws 5ª of Fig. 13 and 14 are tightened against a shaft 8ª on which the inner ring 2ª fits, the screw-engaged portions of said ring 2ª are drawn divergingly outward, thereby tensioning the portion of said ring which is outside of the angle between the screws and drawing the medial portion thereof against the shaft, the distortion of the split inner ring in this instance being such that its end portions are pressed outwardly against the outer ring. The screws as they are tightened shift relative to the outer ring in directions away from each other and bind in the clear holes at the sides thereof outside of said angle. It will be observed in Fig. 14 that the screws 5ª bear against the shaft on the opposite side thereof from that against which the inner ring is tensioned, wherefore the screws when tightened fasten said inner ring rigidly to the shaft, while the outer ring becomes fastened to the inner ring by the binding of the screws in the clear holes and the pressing outwardly of the end portions of the split inner ring against the outer ring.

In the collar of the species represented by Figs. 13 and 14, the screws may be arranged at any angle between their centers within a wide range, say from about or less than 45° to 180°.

Figs. 15 and 16 show an embodiment of the invention wherein the screws are arranged diametrically opposite or at an angle of 180° between their centers. In said figures, 1ᵇ is the outer ring, 2ᵇ the split inner ring, 4ᵇ the split in the latter, 5ᵇ the set-screws and 7ᵇ the clear holes. As the screws 5ᵇ are tightened against the shaft 8ᵇ, they distort the split inner ring 2ᵇ and fasten the two rings 1ᵇ and 2ᵇ in fixed relation to the shaft substantially in the same manner as in Figs. 13 and 14. In this operation, the screws 5ᵇ of Figs. 14 and 15 shift relative to the outer ring toward the middle of that portion of the inner ring which is continuous from screw center to screw center, and bind in the clear holes at the sides thereof nearest said middle or furthest from the split 4ᵇ.

An embodiment of the invention similar in operating characteristics to those of Figs. 13 to 16 would be obtainable if the screws were arranged at an angle of even substantially less than 180° in the portion of the collar in which the inner ring is continuous from screw center to screw center, the split or gap in said ring being opposite said portion. Thus in collars having the screws arranged at an angle between their centers of less than 180° and having the split or gap in the inner ring opposite the portion thereof between the screws, there is an available range of angles of from about 170° to 180°, in addition to the hereinbefore indicated range of from about 90° to about 150°.

In all embodiments of the invention having the screws disposed radially, the angular spacing of the screws may be considered to be the angular distance from screw center to screw center in the portion of the collar in which the inner ring is continuous from screw center to screw center, or in other words the screws may be considered as arranged at the angle in which the included portion of the inner ring is continuous, as distinguished from the angle in which the split or gap in said ring is included. Thus in a collar such as shown in Figs. 13 and 14, the screws may be considered as arranged at an angle which is the reflex angle to that in which the split or gap is included. For example, if the split or gap 4ª in Fig. 13 is included in an angle between the screws of 120°, the screws may be considered as arranged at the reflex angle of 240°. Considering the matter in this way, it is apparent that in all of the several disclosed embodiments of the invention the screws as they are tightened shift relative to the outer ring in corresponding directions and bind in the screw holes at corresponding sides thereof. An in all cases the circumferential differential, upon which depends the maximum shiftability of the screw centers except for restriction thereof by binding of the screws in the clear holes, is the difference between the circumferential distances from screw center to screw center on the inside of the outer ring and outside of the inner ring in the portion of the collar in which the inner ring is continuous from screw center to screw center. For all embodiments, the circumferential differential may be ascertained by the formula hereinbefore given.

The several disclosed embodiments of the invention are fundamentally similar, though in collars such as shown in Figs. 1 to 4 the screws when tightened distort the split inner ring so that its end portions bear inwardly against the shaft, whereas in Figs. 13 and 14 and also Figs. 15 and 16 the end portions of the inner ring, when distorted by the tightening of the screws, press outwardly against the outer ring. In variously differently designed collars of the species represented by Figs. 1 to 4, the outer ring may be made fast to the inner ring by pressure of portions of the distorted inner ring against the outer ring at opposite sides of the shaft, or by binding of the screws in the clear holes, or by both agencies. In collars of the other species shown in Figs. 13 to 16, fastening of the outer ring to the inner ring is dependent in part upon binding of the screws in the clear holes, which of course is desirable in all embodiments for locking the screws.

Collars embodying the invention may be designed to compare favorably in strength and holding capacity of the screws with ordinary collars of comparable sizes, and may be manufactured in mass production at half or less than half the cost of production of such ordinary collars of comparable sizes.

The phase of the invention which has to do with the screw-locking function is not dependent upon the use of a cup-shaped shell or sheet-metal stamping on the outer ring, which however is desirable in any event for simplicity and lightness, while moreover it is desirable to provide a collar which, as those shown and described, gives both advantages of relatively inexpensive construction and screw locking capability.

A further advantage of the invention is that, in view of having a split resilient inner ring, the collar can be slipped on a shaft of a diameter fully as large as or even a few thousandths of an inch larger than the inside diameter of said inner ring, provided the inside diameter of the flange 3 be sufficiently large to allow it.

Although in the illustrative structures the clearance between the rings 1 and 2 is so large that they have a sloppy fit one in the other, it is apparent that this clearance could be considerably reduced. Collars of screw-locking capability embodying the invention can be produced with a difference of only $\frac{1}{16}$" between the inside diameter of the outer ring and outside diameter of the inner ring, giving an all around clearance between the rings when in concentric relation of only $\frac{1}{32}$". Thus in possible embodiments of the invention having screw-locking capability, the inner ring may have a fairly close though loose or free slip fit in the outer ring.

I claim:

1. A collar comprising an outer ring, a split resilient inner ring, and a pair of angularly spaced set-screws engaging in threaded holes therefor in the inner ring and loose in threadless holes therefor in the outer ring for fastening the collar to a shaft on which the inner ring fits, said screws and holes therefor being in a half of the collar the portion of which between the screws is opposite the split or gap in the inner ring, the outside diameter of the inner ring being substantially and materially less than the inside diameter of the outer ring and the screws being arranged to draw an intervening portion of the inner ring tight against the shaft by drawing the screw-engaged portions thereof outwardly in diverging directions, with accompanying shifting of the screw centers circumferentially toward each other relative to the outer ring, the clearance between the screws and inner walls of said threadless holes being sufficiently restricted to cause the screws as they are tightened to bind in said threadless holes.

2. A collar comprising an outer ring, a split resilient inner ring, and a pair of angularly spaced set-screws engaging in threaded holes therefor in said inner ring and loose in threadless holes therefor in said outer ring, said screws and holes therefor being in a half of the collar and the split or gap in the inner ring being in said half between the screws, the outside diameter of the inner ring being substantially less than the inside diameter of the outer ring, the screws being arranged to tension the portion of the inner ring which is continuous from screw-center to screw-center and draw its medial portion against the shaft by drawing the screw-engaged portions of said inner ring divergingly outwards, with accompanying shifting of the screw centers relative to the outer ring in directions away from each other, the clearance between the screws and outer walls of the threadless holes in the outer ring being sufficiently restricted to cause the screws as they are tightened to bind in the threadless holes against said outer walls.

3. A collar comprising an outer ring, a split resilient inner ring, and a pair of angularly spaced set-screws engaging in threaded holes therefor in the inner ring and loose in threadless holes therefor in the outer ring for fastening the collar to a shaft on which the inner ring fits, said rings having the respective holes mentioned, the outside diameter of the inner ring being substantially less than the inside diameter of the outer ring and the screws being arranged to tension a portion of said inner ring by drawing the screw-engaged portions thereof outwardly, with accompanying shifting of the screw centers relative to the outer ring in directions toward the middle of said tensioned portion, said middle being drawn against the shaft by the screws as they are tightened against the shaft, the split or gap in the inner ring being opposite said tensioned portion, the clearance between the screws and walls of said threadless holes in said tensioned portion being sufficiently restricted to cause the screws as they are tightened to bind in said threadless holes.

4. A collar comprising an outer ring, a split resilient inner ring loosely fitted in said outer ring, the outside diameter of the inner ring being substantially and materially less than the inside diameter of the outer ring, and a pair of angularly spaced set screws threaded in said inner ring and screwable therein against a shaft on which it fits for fastening the collar to such shaft, said outer ring having threadless holes through which the screws are inserted and in which they are partially contained when fully tightened, the screws being arranged to tension against the shaft the portion of the inner ring which is continuous from screw center to screw center, by drawing the screw-engaged portions of said inner ring outwardly, with accompanying shifting of the screw centers circumferentially in opposite directions relative to the outer ring, the clearance between the screws and walls of said threadless holes being sufficiently restricted to cause the screws as they are tightened to bind in said threadless holes.

5. A collar comprising an outer ring, a split resilient inner ring loosely fitted in said outer ring, the outside diameter of the inner ring being substantially and materially less than the inside diameter of the outer ring, and a pair of angularly spaced set screws threaded in said inner ring and screwable therein against a shaft on which it fits for fastening the collar to such shaft, said outer ring having threadless holes through which the screws are inserted and in which they are partially contained when fully tightened, there being only slight clearance between said screws and walls of said threadless holes, the screws being arranged to distort the inner ring and fasten it in distorted shape to the shaft, the distortion of said inner ring effected by fully tightening the screws against the shaft causing a substantial shifting of the screw centers circumferentially in opposite directions relative to the outer ring with resultant locking of the screws by binding thereof in said threadless holes.

6. A collar comprising an outer ring, a split resilient inner ring loosely fitted in said outer ring, the outside diameter of the inner ring being substantially and materially less than the inside diameter of the outer ring, and a pair of angularly spaced set screws threaded in said inner ring and screwable therein against a shaft on which it fits for fastening the collar to such shaft, said outer ring having threadless holes through which the screws are inserted and in which they are partially contained when fully tightened, the screws being arranged to distort the inner ring and fasten it in distorted shape to the shaft, with resultant pressure of portions of the distorted inner ring against the outer ring to fasten the latter to the inner ring.

7. A collar comprising an outer ring, a split resilient inner ring loosely fitted in said outer ring, the outside diameter of the inner ring being substantially and materially less than the inside diameter of the outer ring, and a pair of angularly spaced set screws threaded in said inner ring and screwable therein against a shaft on which it fits for fastening the collar to such shaft, said outer ring having threadless holes through which the screws are inserted and in which they are partially contained when fully tightened, the screws being arranged to draw the medial portion of the split inner ring against the shaft by drawing the screw-engaged portions of said ring outwardly in diverging directions, thereby distorting the inner ring so that the end portions thereof press against the shaft while portions of said inner ring between the medial and end portions press outwardly against the outer ring.

8. A collar according to claim 7 having the screws disposed radially and arranged at an angle of from about 90° to about 120° between their centers, the split or gap in the inner ring being opposite the portion of the collar included in said angle.

No references cited.